United States Patent
Lee et al.

(10) Patent No.: US 10,402,195 B2
(45) Date of Patent: Sep. 3, 2019

(54) FRAMEWORK FOR SUPPORTING MULTIPLE ANALYTIC RUNTIMES

(71) Applicant: General Electric Company, Schenectady, NY (US)

(72) Inventors: Jong Yoon Lee, San Ramon, CA (US); Alexandre Iankoulski, Niskayuna, NY (US); Arnab Guin, San Ramon, CA (US); Yan Or, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/784,513

(22) Filed: Oct. 16, 2017

(65) Prior Publication Data

US 2019/0114168 A1    Apr. 18, 2019

(51) Int. Cl.
*G06F 8/60* (2018.01)
*G06F 8/76* (2018.01)

(52) U.S. Cl.
CPC . *G06F 8/76* (2013.01); *G06F 8/60* (2013.01)

(58) Field of Classification Search
None
See application file for complete search history.

(56) References Cited

U.S. PATENT DOCUMENTS

| | | | | |
|---|---|---|---|---|
| 7,581,231 B2 * | 8/2009 | Smith | ........................ | G06F 9/44 709/203 |
| 2004/0078798 A1 * | 4/2004 | Kelly | ........................ | G06F 8/60 719/310 |
| 2009/0249296 A1 * | 10/2009 | Haenel | ...................... | G06F 8/61 717/120 |
| 2011/0231862 A1 * | 9/2011 | Walsh | ...................... | G06F 13/00 719/318 |
| 2012/0089968 A1 * | 4/2012 | Varadarajan | .......... | G06F 9/5033 717/136 |
| 2012/0185824 A1 * | 7/2012 | Sadler | ...................... | G06F 9/548 717/120 |
| 2013/0145348 A1 * | 6/2013 | Agovic | ............... | G06F 17/3056 717/120 |
| 2016/0154913 A1 * | 6/2016 | Altare | .................... | G06Q 10/06 703/13 |

* cited by examiner

*Primary Examiner* — Isaac T Tecklu
(74) *Attorney, Agent, or Firm* — Buckley, Maschoff & Talwalkar, LLC

(57) ABSTRACT

The example embodiments are directed to a framework that supports multiple runtime environments. In one example, a method includes exporting a software application to a runtime environment via a framework that supports multiple runtime environments, selecting a runtime template based on the export runtime environment, wherein the selected runtime template transforms data being ingested by the software application based on the export runtime environment, executing the software application in the export runtime environment, and controlling data ingestion into the executing software application based on the selected runtime template. According to various aspects, the software application may be developed using a programming language that is designed for use with a particular runtime environment, while the runtime template can enable the software application to be executed in a different runtime environment.

20 Claims, 5 Drawing Sheets

FRAMEWORK FOR SUPPORTING MULTIPLE ANALYTIC RUNTIMES

BACKGROUND

Machine and equipment assets are engineered to perform particular tasks as part of a business process. For example, assets can include, among other things and without limitation, industrial manufacturing equipment on a production line, drilling equipment for use in mining operations, wind turbines that generate electricity on a wind farm, transportation vehicles, and the like. As another example, assets may include devices that aid in diagnosing patients such as imaging devices (e.g., X-ray or MM systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

One of the difficulties in designing a computing platform that supports machine and equipment based software is the wide variety of the software in operation within the environment. For example, a power plant operator may be interested in looking at multiple software components (e.g., analytics) related to the plant in order to manage/view various systems, sub-systems, and applications associated therewith, including generators, cooling towers, a plant floor, materials, alerts, fuel usage, power protection, power distribution, control systems, and/or the like. In order to monitor and control these components, independently developed software applications are typically required. These applications are often developed using different programming languages based on a preference of a particular developer or programmer. However, different programming languages often require different runtime environments. Therefore, a challenge exists with respect to managing software interaction with different runtime environments.

SUMMARY

The example embodiments improve upon the prior art by providing a framework that supports multiple runtime environments for executing an application. According to various aspects, a software application may be migrated or otherwise exported to a runtime environment and an abstraction template may be selected based on the export runtime environment. The abstraction template can be used to encapsulate an input and an output of the software application thereby enabling a software application developed for a first runtime environment to be executed in a different runtime environment. Each runtime environment may have its own respective abstraction template that is based on different input data sources, outputs, and behaviors. In some embodiments, the framework may be used within a cloud computing environment used for deploying software applications used within an Industrial Internet of Things (IIoT).

According to an aspect of an example embodiment, a method includes exporting a software application to a runtime environment via a framework that supports multiple runtime environments, selecting a runtime template based on the export runtime environment, wherein the selected runtime template transforms data being ingested by the software application based on the export runtime environment, executing the software application in the export runtime environment, and controlling data ingestion into the executing software application based on the selected runtime template.

According to an aspect of another example embodiment, a computing system includes a memory storing instructions, and a processor for executing the instructions, wherein when executed, the instructions cause the processor to perform a method including exporting a software application to a runtime environment via a framework that supports multiple runtime environments, selecting a runtime template based on the export runtime environment, wherein the selected runtime template transforms data being ingested by the software application based on the export runtime environment, executing the software application in the export runtime environment, and controlling data ingestion into the executing software application based on the selected runtime template.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
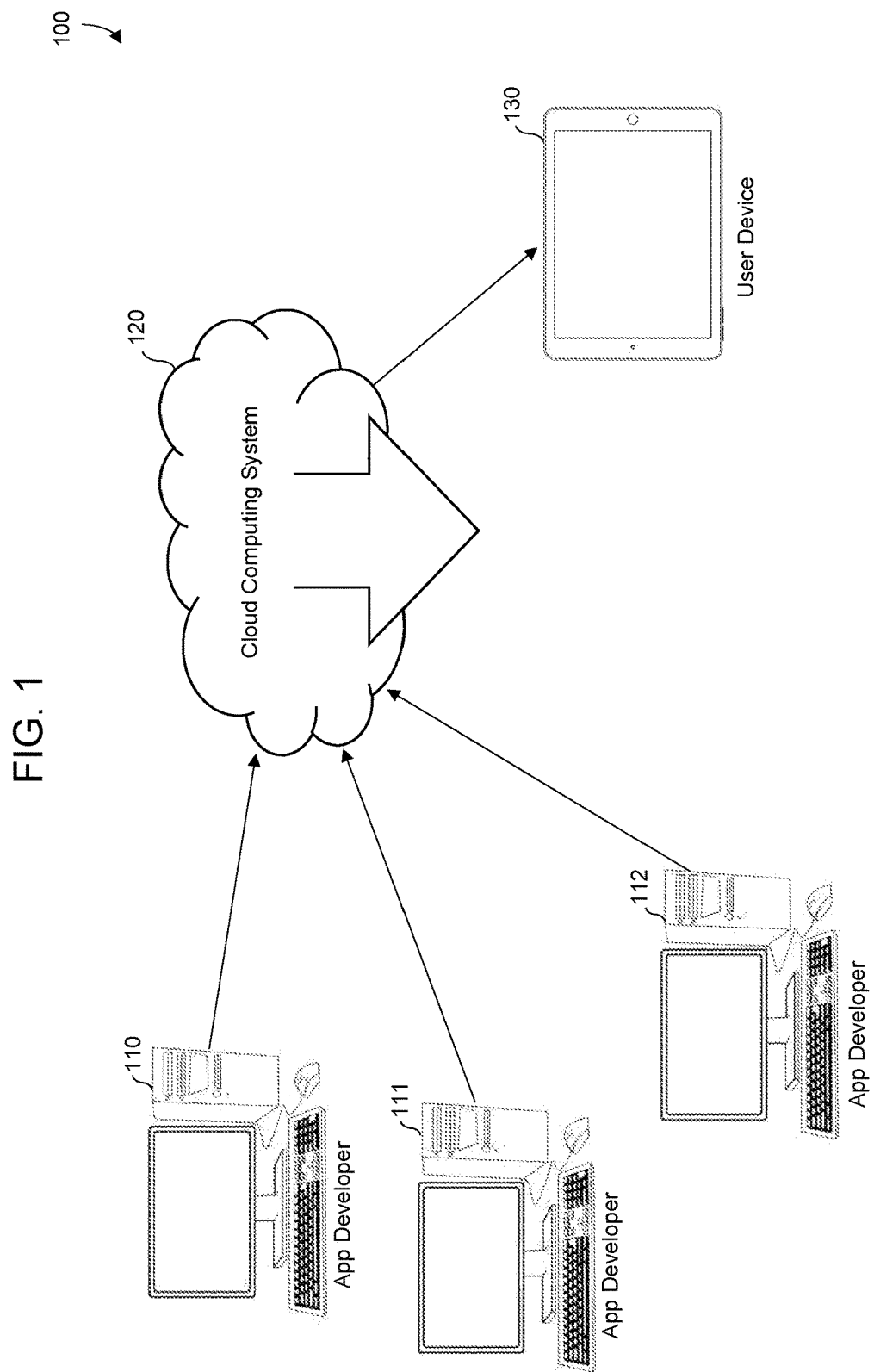
FIG. 1 is a diagram illustrating a cloud computing environment in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a framework that supports execution of a software program (e.g., application, service, code, etc.) in multiple runtime environments and without requiring a developer to generate separate versions of the software application for the different runtime environments. In some embodiments, the software program may be an analytic application that is used to analyze, control, or otherwise interact with machine and equipment assets for use in industry, manufacturing, healthcare, or the like. The software may be tested and deployed on a platform such as a cloud platform, server, or other network environment in which an authorized user has access to a group of independently developed software applications hosted by different and distinct vendors and/or have a different subsets of users authorized for use thereof. In this environment, a developer may use a programming language for building a software application based on their own preference or that best suits the task being performed. Different programming languages often require different runtime environments for execution and testing.

The example embodiments provide an abstraction layer for use by a software program deployed within a runtime environment which is not compatible with a programming language of the software program. According to various aspects, a runtime template may be wrapped around a software program such that it manages inputs and outputs to the application thereby providing a layer of abstraction between the software and the runtime environment where the software is being executed. The framework may include a unique runtime template for each respective runtime environment. The templates can be interchanged by the framework based on the runtime environment thereby enabling the same software program (i.e., code) to be executed in different runtime environments. The runtime template can handle data input, data output, behaviors, and the like, that can be different across each runtime environment. Accordingly, when a software program is built for execution in a first runtime environment, the framework may export the software program to a second runtime environment where it can be successfully executed based on a corresponding runtime template. The runtime template may encapsulate the software program and enable the software program to ingest data and output data within the second runtime environment.

As described herein, a runtime environment is an environment in which software (e.g., application, program, code, service, etc.) executes. The runtime environment is often provided to a software program or other software by the operating system and provides a state in which a target machine has access to resources such as software libraries, system variables, environment variables, and the like, which can be used by the software application during execution. The runtime environment may also be associated with one or more application programing interfaces (APIs). When a software program is executed, it is in a runtime state. In this state, the software can send instructions to the computer's processor and access the computer's memory (RAM) and other system resources.

The framework herein supports multiple runtime environments which may be used in conjunction with a virtual model (i.e., a digital twin) of a physical asset such as a machine or equipment in the field of industry, manufacturing, healthcare, or the like. For example, the asset may include a wind turbine, a jet engine, a locomotive, a healthcare machine, or the like. The virtual model may simulate a state of the physical asset based on data captured by sensors and fed back to the virtual model. For example, the virtual model may receive data from an edge at which the physical asset is disposed.

Analytical applications (i.e., analytics) may be performed to analyze a behavior of the asset by running algorithms and other processes with respect to the virtual model. Analytical applications may be deployed in different runtime environments based on the data coming from the asset and the task being performed by the analytic. The abstraction layer may be used to bind an analytical application with a data source regardless of a runtime environment in which the analytical application is configured for use with. In this case, the analytical application may be associated with a virtual model of a real asset and the data source may be data from the real asset. Assets may store and provide metadata that includes binding information which can be used by the platform to determine which runtime environment to export and deploy an analytical application. The binding information may include mapping data which provides a location for source data to be ingested by the application and a mapping for storing data output from the execution of the application.

While progress with industrial and machine automation has been made over the last several decades, and assets have become 'smarter,' the intelligence of any individual asset pales in comparison to intelligence that can be gained when multiple smart devices are connected together, for example, in the cloud. Aggregating data collected from or about multiple assets can enable users to improve business processes, for example by improving effectiveness of asset maintenance or improving operational performance if appropriate industrial-specific data collection and modeling technology is developed and applied.

Assets can be outfitted with one or more sensors configured to monitor respective operations or conditions. Data from the sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, enhanced software algorithms for operating the same or similar assets, better operating efficiency, and the like.

The framework for supporting multiple runtime environments may be used in conjunction with applications for managing machine and equipment assets and can be hosted within an Industrial Internet of Things (IIoT). In an example, an IIoT connects assets, such as turbines, jet engines, locomotives, healthcare devices, and the like, to the Internet or cloud, or to each other in some meaningful way such as through one or more networks. The framework described herein can be implemented within a "cloud" or remote or distributed computing resource. The cloud can be used to receive, relay, transmit, store, analyze, or otherwise process information for or about assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of machine and equipment assets with the remote computing resources to enable the IIoT often presents technical challenges separate and distinct from the specific industry and from computer networks, generally. A given asset may need to be configured with novel interfaces and communication protocols to send and receive data to and from distributed computing resources. Given assets may have strict requirements for cost, weight, security, performance, signal interference, and the like, such that enabling such an interface is rarely as simple as combining the asset with a general-purpose computing device. In many situations, control and analysis of an asset requires multiple applications executing in different runtime environments. However, finding a way to interact these different environments can be challenging. To address these problems and other problems resulting from the intersection of certain industrial fields and the IIoT, the example embodiments provide a framework for supporting multiple runtime environments.

The Predix™ platform available from GE is a novel embodiment of such an Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial or healthcare based assets can be uniquely situated to leverage its understanding of assets themselves, models of such assets, and industrial operations or applications of such assets, to create new value for industrial customers through asset insights.

FIG. 1 illustrates a cloud computing environment 100 capable of supporting multiple runtimes in accordance with an example embodiment. Referring to FIG. 1, the cloud computing environment 100 includes a plurality of application developers 111, 112, and 113, a cloud computing system 120, and a user device 130. It should be appreciated that additional computing components and devices may be included, and that the example is merely shown for convenience of description. The application developers 111, 112, and 113 may independently develop software applications and launch the applications on the cloud computing system 120 which also hosts the applications. Here, the applications may be deployed within a runtime environment of cloud computing system 120. For example, the cloud computing system 120 may receive executable files from the application developers 111, 112, and 113, and store them in a catalog of software applications that are available to be accessed by a user such as an operator of the user device 130.

In this example, the cloud computing system 120 may be associated with an Industrial Internet of Things (IIoT). For example, an asset management platform (AMP) can reside in cloud computing system 120, in a local or sandboxed environment, or can be distributed across multiple locations or devices and can be used to interact with assets (not shown). The AMP can be configured to perform any one or more of data acquisition, data analysis, or data exchange with local or remote assets, or with other task-specific processing devices. For example, the AMP may be connected to an asset community (e.g., turbines, healthcare, power, industrial, manufacturing, mining, oil and gas, etc.) which is communicatively coupled with the cloud computing system 120. Also, the cloud computing system 120 may include several layers, for example, a data infrastructure layer, a cloud foundry layer, and modules for providing various functions.

Information from an asset, about the asset, or sensed by an asset itself may be communicated from the asset (or a computing device associated therewith) to the cloud computing system 120. In an example, an external sensor can be used to sense information about a function of an asset, or to sense information about an environment condition at or near an asset. The external sensor can be configured for data communication with the cloud computing system 120 which can be configured to use the sensor information in its analysis of one or more assets. Furthermore, an operation of the one or more assets may be enhanced or otherwise controlled by the cloud computing system 120 and/or the user device 130. The data provided from the asset may include time-series data or other types of data.

The user device 130 (e.g., smart phone, workstation, tablet, appliance, kiosk, and the like) may connect to the cloud computing system 120 via a network such as the Internet, a private network, a combination thereof, and the like. The user device 130 may purchase or otherwise receive authorization to access one or more applications provided by application developers 111, 112, and 113. In operation, the user device 130 may display a centralized user interface that provides a shell for running instances of the applications and which can be configured for data communication with the cloud computing system 120. The user interface may enable the user of user device 130 to interact with applications provided by application developers 111, 112, and 113. The user device 130 can be used to monitor or control one or more assets, for example, via the user interface. In an example, information about the asset community may be presented to an operator at the user device 130 from the cloud computing system 120. For example, the user device 130 can include options for optimizing one or more members of the asset community based on analytics performed at the cloud computing system 120.

In some embodiments, the cloud computing system 120 may include a local, system, enterprise, or global computing infrastructure that can be optimized for industrial data workloads, secure data communication, and compliance with regulatory requirements. The cloud computing system 120 can include services that developers can use to build or test industrial or manufacturing-based applications and services to implement IIoT applications. For example, the cloud computing system 120 may host a microservices marketplace where developers can publish their distinct services and/or retrieve services from third parties. In addition, the cloud computing system 120 can host a development framework for communicating with various available services or modules. The development framework can offer distinct developers a consistent contextual user experience in web or mobile applications. Developers can add and make accessible their applications (services, data, analytics, etc.) via the cloud computing system 120.

According to various aspects, the framework within cloud computing system 120 may support multiple runtime environments. For example, the different runtime environments that may be supported can include Cloud Foundry runtime, Spark runtime, Docker runtime, and the like. Each application can be developed using a programming language independently chosen by a developer/designer. In most cases, the programming language used to develop an application dictates a particular runtime environment for that application. Accordingly, the applications hosted on cloud computing system 120 often require different runtime environments. To accommodate the different runtime environments, the example embodiments provide an abstraction layer or template that may be wrapped around a software application when that software application is migrated or otherwise exported to a foreign runtime environment to enable the software application to operate correctly within the foreign runtime environment.

In some cases, the cloud computing system 120 may include a data services module or other development tools that can facilitate application development by the application developers 111, 112, and 113. For example, the data services module can enable developers to bring data into the cloud computing system 120 and to make such data available for various applications, such as applications that execute at the cloud, at a machine module, at an asset, or other location. Here, the data services module can be configured to cleanse, merge, or map data before ultimately storing it in an appropriate data store, for example, at the cloud computing system 120. Mapping information about the data may be stored within metadata provided by an asset. The metadata may be accessible by the framework such that the framework can bind incoming data to an application based on a runtime environment where the application is being executed.

When using and building a digital twin (which is a digital representation of an asset) to monitor the performance and likeness of the asset, different analytics may be built specifically for different runtimes and different use cases based on developer preference and/or the task at hand. The example embodiments are directed to an abstraction template which can be wrapped around an analytic application so that analytic developers/builders do not have to worry about where the analytic is going to run or how data gets consumed because the data binding between the incoming asset data and the analytic is abstracted. Accordingly, a developer has the ability to design their analytic using any programming language and runtime that they are comfortable with.

Figure 2:
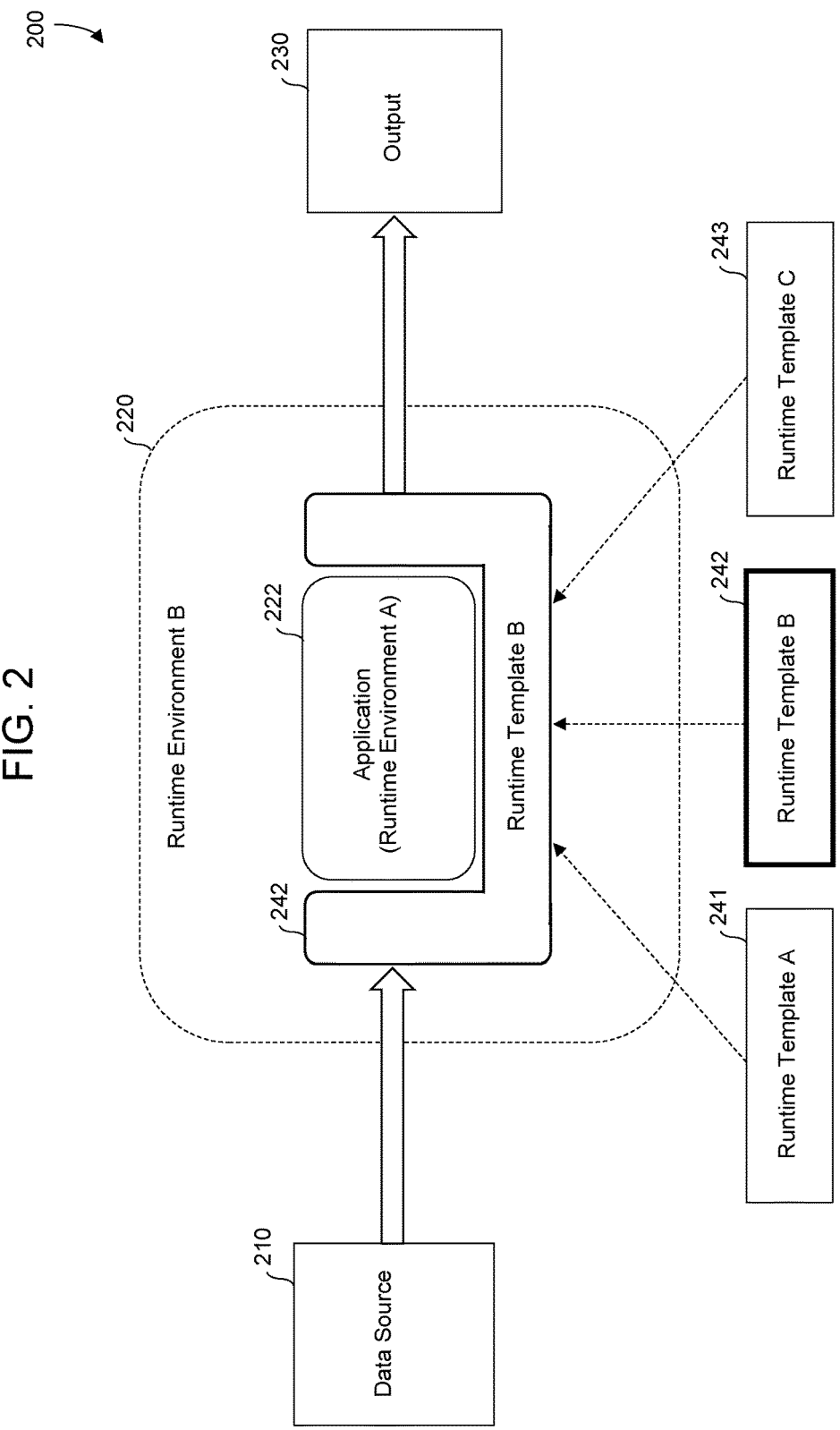
FIG. 2 is a diagram illustrating a framework that supports multiple runtime environments in accordance with an example embodiment.

FIG. 2 illustrates a framework 200 that supports multiple runtime environments in accordance with an example embodiment. In this example, the framework 200 may be stored within the cloud computing system 120 of FIG. 1, or another computing environment such as a server, database, or the like. Referring to FIG. 2, the framework 200 includes a runtime environment 220 where applications are executed. In this example, the runtime environment 220 is associated with a runtime environment B. According to various aspects, the applications executed within runtime 220 may be compatible with a different runtime environment (e.g., runtime environment A, runtime environment C, etc. To facilitate proper execution of the applications including data ingestion, data output, and application behavior, a runtime template (e.g., runtime templates 241, 242, or 243) may be added to an application. In the example of FIG. 2, an application 222 is developed for a runtime environment A, and is deployed or otherwise executed within a runtime environment. Here, the framework (e.g., processor) may select a runtime template B 242 from among a group of runtime templates 241, 242, and 243, and add the runtime template B 242 to the application 222 to enable the application to execute properly within runtime environment B 220.

Each runtime template (241, 242, and 243) may manage various attributes for an application such as the application 222. For example, each runtime template 241, 242, and 243 may manage APIs, a lifecycle of the application, data ingestion for the respective runtime, data output for the respective runtime, and the like, when the runtime template is combined with the application 222. The runtime templates 241, 242, and 243 provide an abstraction layer that relieves a developer of the application 222 from worrying about these details for different runtime environments. The runtime templates 241, 242, and 243 may also be referred to as export templates. When an application is to be exported to a runtime environment, the application is provided with an export template for the target runtime environment where the migration is occurring. Each runtime template 241, 242, and 243 may include a wrapper code that wraps around a programming model of the application model. The runtime templates 241, 242, and 243, can bind data from a data source 210 with the application 222 while executing in a foreign runtime environment 220. The output of the executed application 222 may be stored in an output 230 and controlled by the runtime template.

Figure 3:
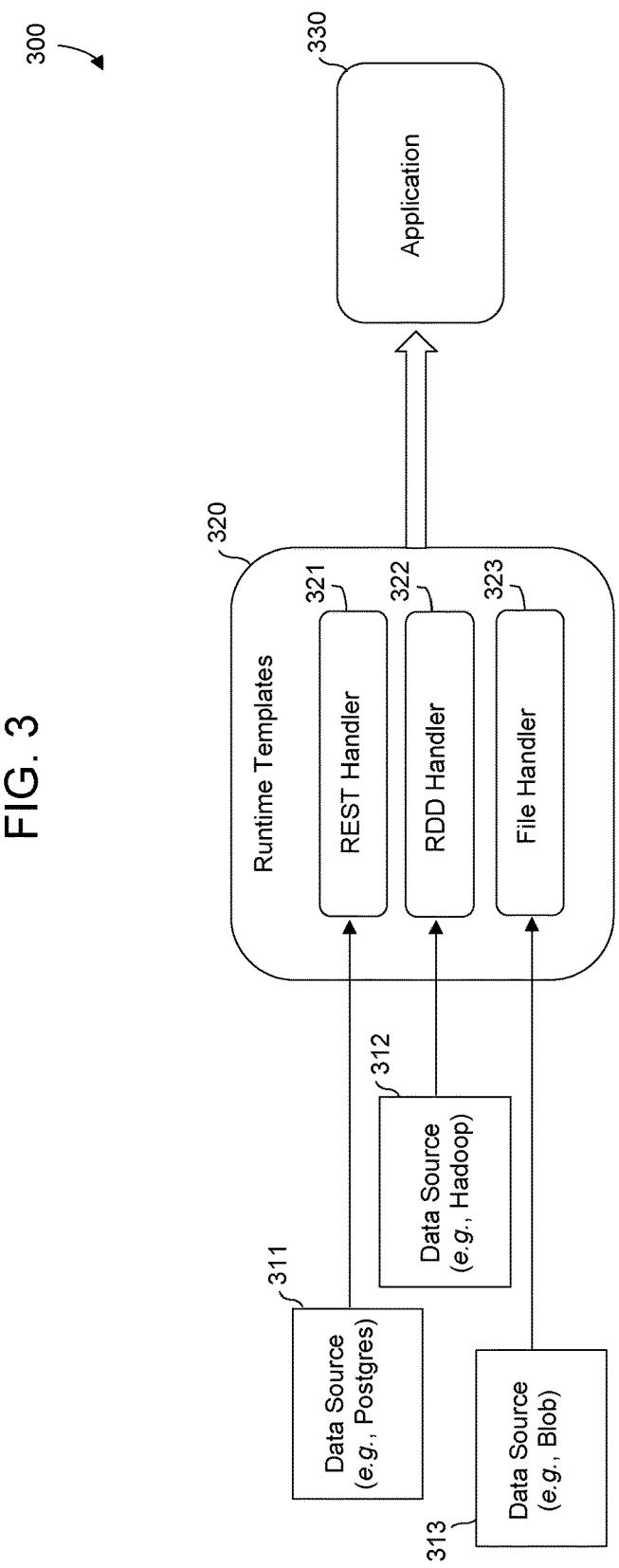
FIG. 3 is a diagram illustrating a data ingestion process for an application that can be executed in multiple runtime environments in accordance with example embodiments.

Non-limiting examples of runtime environments include Cloud Foundry, Docker, Spark, and the like. Each runtime environment causes applications to behave differently. There are different APIs, different data consumptions, lifecycles, different data outputs, and the like. Here, the runtime template provides an abstraction layer between an analytic and the runtime environment. When that analytic is exported for a particular runtime (e.g., Spark runtime) the platform determines the dependencies and selects an export template that makes the bridge between the analytic model and the different runtime environment. The bridge provides a binding between the data coming in from the asset to the analytic and the output of the analytic is stored based on the binding (and this changes per runtime). FIG. 3 further illustrates an example of data ingestion based differently on different runtime environment.

Both the input 210 and the output 230 of data may be bound to the application 222 using a runtime template. The information used to bind the application 222 to the input 210 and the output 230 may be stored by an asset associated with the application 222. However, the actual data may come from another data source. The system supports support multiple data sources. The binding information (tag mapping) is stored in the asset and provides where to get the data from and how and where to store the output of the application 222. This behavior changes per runtime. In some embodiments, the application 222 may be stored in a catalog of the framework 200. The catalog may also provide the metadata for each application stored therein such as what the analytic is used for, a platform, a runtime, and the like, which the application is designed for, along with an executable file that gets executed when you run the application.

Each runtime has a different set of programming languages that it supports. The way the data is handled and moved around is different in each runtime environment. Also, the way the application is executed may be different. Multiple runtime environments can be supported by creating a layer of abstraction around the underlying application model. As described herein, an export template provides an abstraction layer around the application. A selected runtime template bridges the different runtime environments and the application model, manages the input and output data, and coordinates the execution. The export templates may be created for each analytic runtime, and for each programming language that is supported by the runtime.

Analytical applications may analyze data from a digital twin and make a prediction (fault-prediction) about a current state of the asset. Given the asset and the type of analytic there is a binding that happens with the digital twin. There may be a thousand different assets deployed. For each instance, there is information that needs to be bound to applications being executed in association therewith such as serial number of the asset, location information about where the vibration data is stored, and the like. The binding may occur by receiving binding data from the asset and looking at where the data comes from (mapping) and when the analytic gets executed the framework knows how to bind the data by looking at the mapping in the asset model. Binding may refer to binding time-series data coming in from the asset with the virtual model (digital twin) of the asset.

For a Cloud Foundry runtime environment, the data comes in as a REST call, and the output goes out as an HTTP response. For Spark runtime environment, the data is stored in RDD/Hadoop specific format and the output gets stored in RDD. But with the abstraction layer provided herein, the data does not have to be in a particular format because the abstraction template makes it compatible. For example, each target runtime has a corresponding export template. An application may be built via a UI, and when the model is built there are a set of export templates for the respective target runtimes. When an analytic gets exported to a particular runtime, then the framework may figure out the dependencies (i.e. analytic runtime) and select the template for the application based on the determined runtime. Therefore, the application does not have to know about the runtime detail because it is handled by the template.

FIG. 3 illustrates a data ingestion process 300 for an application that can be executed in multiple runtime environments in accordance with example embodiments. Referring to FIG. 3, the runtime templates 320 may be associated with different handlers such as representational state transfer (REST) handler 321, resilient distribute datasets (RDD) handler 322, and File handler 323, which are each associated with a respective data sources 311, 312, and 313. The handlers 321, 322, and 323, may transform data into a format that is compatible with application 330 (i.e., a runtime environment that application 330 was developed for).

For example, the Cloud Foundry runtime supports a list of programming languages environment with buildpacks for each application that are packaged together with export template and buildpack that correspond to the matching programming environment. In this case, the application plus the export template becomes the Cloud Foundry application. As a result, the application may accept execution requests over a REST interface, handle input and output of analytics, and the like, within the Cloud Foundry runtime. Meanwhile, in a Docker runtime, the application plus the export template becomes an executable and the executable becomes "Dockerized" which produces a Docker image. The resulting docker image may be added to a docker registry where it gets containerized and executed in a container. Spark runtime supports a few programming environments such as Java and Python. Here the application plus the export template becomes a Hadoop application which gets submitted as a Spark job that is executed by the Spark runtime.

Each application has associated input and output. The input can come from various data sources. It could be a blob store that contains a .csv file that encapsulates various sensor data. It could be a SQL database where the data is organized in columns and rows. It could be a time series data where the sensor data is labeled with timestamps. The export template 320 provides an abstraction for the underlying analytic by providing a binding of the data sources 311, 312, and 313 to the application 330. When the application 330 is ready to execute/run, the data may be extracted from a bound data source, go through transformation if necessary, into a format that an algorithm of the application 330 expects.

The application execution model is different for each runtime. For a Cloud Foundry application, a REST interface triggers execution of the application. Docker based applications are executed in a different manner based on the Docker container technology, whether it's using Docker, Swarm, Mesos, or Kubernetes. Spark jobs are managed using Hadoop service, such as Yarn. The abstraction for analytic execution is created by a generic REST API for analytic execution. Depending on where the analytic is deployed, the execution endpoint can invoke the right method to start the execution in such environment. When the analytic is executed, the export template 320 can manage the data ingestion and be able to feed the data into the underlying application 330.

Figure 4:
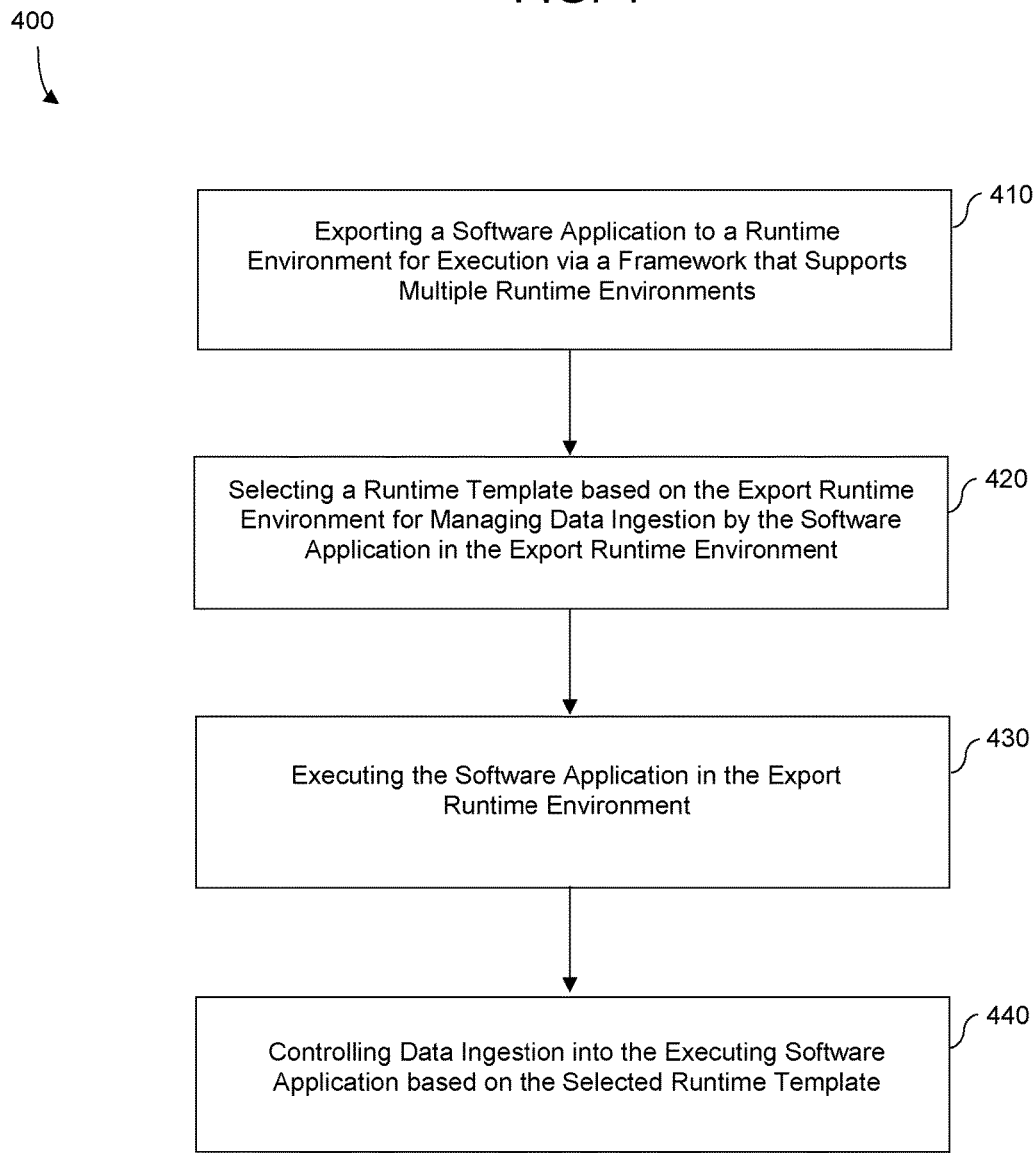
FIG. 4 is a diagram illustrating a method for executing an application in a framework that supports multiple runtime environments in accordance with an example embodiment.

FIG. 4 illustrates a method 400 for executing an application in a framework that supports multiple runtime environments in accordance with an example embodiment. For example, the method 400 may be performed by the cloud computing system 120 shown in FIG. 1 or another computing device such as a server, user device, database, or the like. Referring to FIG. 4, in 410, the method includes exporting a software application to a runtime environment via a framework that supports multiple runtime environments. The exporting may include migrating an executable file of the software application from a file repository or other storage, to a runtime environment where the software application is to be executed. As described in the example of FIG. 4, the software application may be designed to be executed in a first runtime environment. However, the export runtime environment where the software application is to be executed may be a different runtime environment (i.e., a second runtime environment) from the first runtime environment. As a result, the data inputs and data outputs of the software application may not be compatible with the second runtime environment.

According to various embodiments, in 420, the method includes selecting a runtime template based on the export runtime environment to be used to manage a behavior of the software application within the second runtime environment. The runtime template may include wrapper code that provides a layer of abstraction (e.g., a wrap) around the software application. For example, the runtime template may be used to transform data being ingested by the software application based on the export runtime environment. In addition to data input, the runtime template may help control data output for the software application in the second runtime environment (e.g., the foreign runtime environment), libraries accessed, APIs and how they are accessed, and the like. In some embodiments, the framework may support more than two runtime environments (e.g., three or more). Non-limiting examples of runtime environments include Cloud Foundry, Docker, Spark, and the like.

The selecting in 420 may include selecting the runtime template from among a plurality of possible runtime templates corresponding to a plurality of respective runtime environments where each runtime environment has its own unique runtime template. In some embodiments, the software application may be associated with an asset included in an industrial environment. In this example, the software application may receive and perform algorithms based on data received from the asset. Accordingly, the selected runtime template may be used to bind data associated with the asset to the executing software application. For example, the asset may provide metadata indicating mapping information for data provided from the asset. The framework may use the mapping information to ingest data to the application and output data from the application.

In 430, the method includes executing the software application in the export runtime environment, and in 440, controlling data ingestion into the executing software application based on the selected runtime template. For example, the controlling may include determining a location of the source data to be ingested by the executing software application based on the selected runtime template. In some embodiments, the framework may extract data from the source data and transform the extracted data into a format of the identified runtime environment based on the selected runtime template. In some embodiments, the method may further include determining a location at which to store data that is output from the executing software application based on the selected runtime template, and storing the output data at the determined location.

Figure 5:
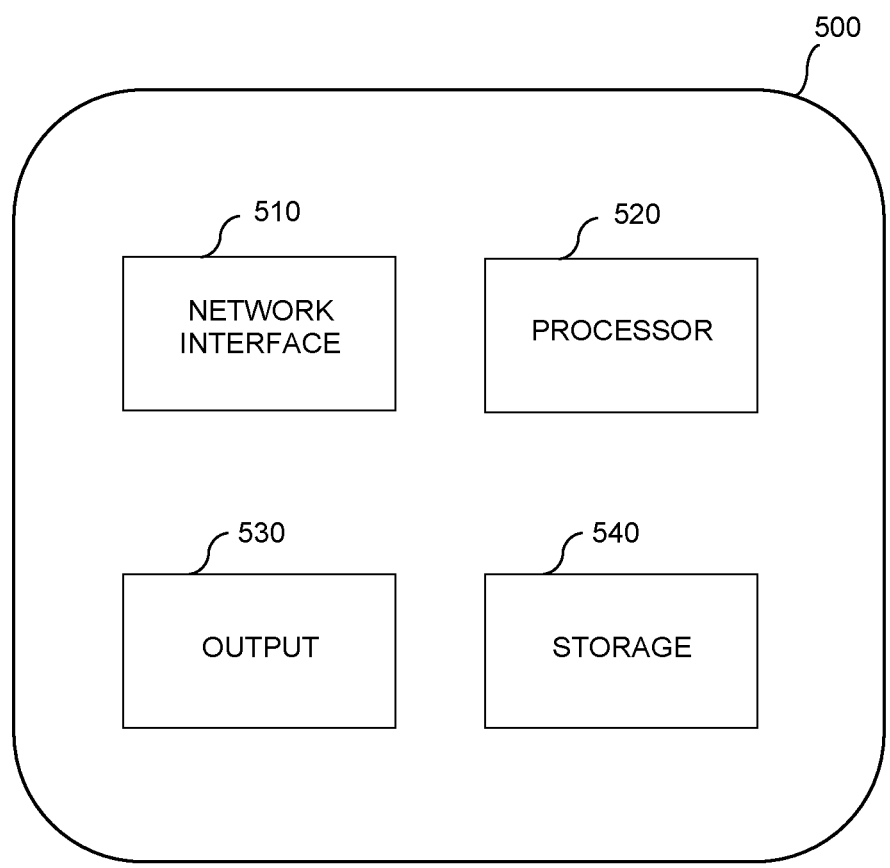
FIG. 5 is a diagram illustrating a computing system for executing an application in a framework that supports multiple runtime environments in accordance with an example embodiment.

FIG. 5 illustrates a computing system 500 for executing an application in a framework that supports multiple runtime environments in accordance with an example embodiment. For example, the computing system 500 may be the cloud computing system 120 or an instance thereof, shown in FIG. 1, a database, a user device, a server, or another type of device. Also, the computing system 500 may perform the method 400 of FIG. 4. Referring to FIG. 5, the computing system 500 includes a network interface 510, a processor 520, an output 530, and a storage device 540 such as a memory. Although not shown in FIG. 5, the computing system 500 may include other components such as a display, an input unit, a receiver/transmitter, and the like.

The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the device 600, an externally connected display, a display connected to the cloud, another device, and the like. The storage device 540 is not limited to a particular storage device and may include any known memory device such as RAM, ROM, hard disk, and the like, and may or may not be included within the cloud environment. The storage 540 may store software modules or other instructions which can be executed by the processor 520 to perform the method 400 shown in FIG. 4.

According to various embodiments, the processor 520 may migrate or otherwise export a software application to a runtime environment via a framework that supports multiple runtime environments. The exported software application may be designed for a first runtime environment but may be moved to and launched in a second runtime environment different from the first runtime environment. The processor 520 may select a runtime template based on the export runtime environment from among a plurality of runtime templates for a plurality of respective runtime environment. The processor 520 may receive mapping information included in metadata provided by one or more of the software application itself, a catalogue of software applications, an asset associated with the application, and the like. The mapping information may indicate a runtime environment that the software application is compatible with. When the native runtime environment of the application is different from the export runtime environment, the selected runtime template may transform data being ingested by the software application based on the export runtime environment. Each runtime environment may have its own dedicated runtime template. Accordingly, the processor 520 may select the runtime template from among a plurality of possible runtime templates based on the export runtime environment.

The processor 520 may execute the software application in the export runtime environment and control data ingestion into the executing software application based on the selected runtime template. For example, the processor 520 may determine a location of source data to be ingested by the executing software application based on the selected runtime template. For example, the processor 520 may extract data from the source data and transform the extracted data into a format of the identified runtime environment based on the selected runtime template. In some embodiments, the processor 520 may determine a location at which to store data that is output from the executing software application based on the selected runtime template, and store the output data at the determined location such as a location in storage 540.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method comprising:
exporting an executable of a software application to a runtime environment via a framework that supports multiple runtime environments;
selecting a runtime template based on the export runtime environment, wherein the selected runtime template wraps around an input and an output of the exported software application and provides an abstraction with an external source transmitting source data ingested by the input of the exported software application and an abstraction with a storage location that stores processing results output from the output of the exported software application, based on the export runtime environment;
executing the software application in the export runtime environment; and
controlling data ingestion into and data output from the executing software application based on the selected runtime template.

2. The computer-implemented method of claim 1, wherein the controlling comprises determining a location of the source data to be ingested by the executing software application based on the selected runtime template.

3. The computer-implemented method of claim 2, wherein the controlling comprises extracting data from the source data and transforming the extracted data into a format of the identified runtime environment based on the selected runtime template.

4. The computer-implemented method of claim 1, further comprising determining the storage location at which to store data that is output from the executing software application based on the selected runtime template, and storing the output data at the determined location.

5. The computer-implemented method of claim 1, wherein the selecting comprises selecting the runtime template from among a plurality of interchangeable runtime templates capable of being wrapped around the software application based on a plurality of different respective runtime environments.

6. The computer-implemented method of claim 1, wherein the source data comprises time-series data associated with an industrial asset included in an industrial environment, and the selected runtime template comprises a handler associated with the export runtime environment that binds the time-series data associated with the industrial asset to the executing software application.

7. The computer-implemented method of claim 1, wherein the selected runtime template comprises wrapper code that wraps around an input and an output of a stand-alone cloud software application.

8. The computer-implemented method of claim 1, wherein the software application comprises an analytic application that is developed with a programming language for use in a first runtime environment, and the selected runtime template enables the executable of the software application to be executed in a second runtime environment which is different than the first runtime environment.

9. A computing system comprising:
a memory storing instructions; and
a processor for executing the instructions, wherein when executed, the instructions cause the processor to perform a method comprising:
exporting an executable of a software application to a runtime environment via a framework that supports multiple runtime environments;
selecting a runtime template based on the export runtime environment, wherein the selected runtime template wraps around an input and an output of the exported software application and provides an abstraction with an external source transmitting source data ingested by the input of the exported software application and an abstraction with a storage location that stores processing results output from the output of the exported software application, based on the export runtime environment;
executing the software application in the export runtime environment; and
controlling data ingestion into and data output from the executing software application based on the selected runtime template.

10. The computing system of claim 9, wherein the controlling comprises determining the source location of the source data to be ingested by the executing software application based on the selected runtime template.

11. The computing system of claim 10, wherein the controlling comprises extracting data from the source data and transforming the extracted data into a format of the identified runtime environment based on the selected runtime template.

12. The computing system of claim 9, wherein the method further comprises determining the storage location at which to store data that is output from the executing software application based on the selected runtime template, and storing the output data at the determined location.

13. The computing system of claim 9, wherein the selecting comprises selecting the runtime template from among a plurality of interchangeable runtime templates capable of being wrapped around the software application based on a plurality of different respective runtime environments.

14. The computing system of claim 9, wherein the source data comprises time-series data associated with an industrial asset included in an industrial environment, and the selected runtime template comprises a handler associated with the export runtime environment that binds the time-series data associated with the industrial asset to the executing software application.

15. The computing system of claim 9, wherein the selected runtime template comprises wrapper code that wraps around an input and an output of a stand-alone cloud software application.

16. A non-transitory computer readable medium having stored therein instructions that when executed cause a computer to perform a method comprising:
exporting an executable of a software application to a runtime environment via a framework that supports multiple runtime environments;
selecting a runtime template based on the export runtime environment, wherein the selected runtime template wraps around an input and an output of the exported software application and provides an abstraction with an external source transmitting source data ingested by the input of the exported software application and an abstraction with a storage location that stores processing results output from the output of the exported software application, based on the export runtime environment;

executing the software application in the export runtime environment; and controlling data ingestion into and data output from the executing software application based on the selected runtime template.

17. The non-transitory computer readable medium of claim 16, wherein the controlling comprises determining the source location of the source data to be ingested by the executing software application based on the selected runtime template.

18. The non-transitory computer readable medium of claim 17, wherein the controlling comprises extracting data from the source data and transforming the extracted data into a format of the identified runtime environment based on the selected runtime template.

19. The non-transitory computer readable medium of claim 16, wherein the software application is developed for use in a first runtime environment, and the selected runtime template enables the software application to be executed in a second runtime environment which is different than the first runtime environment.

20. The method of claim 1, wherein the external source comprises a computing device associated with an industrial asset, and the exporting of the executable of the software application comprises selecting the export runtime environment from among a plurality of export runtime environments based on metadata associated with the industrial asset.

* * * * *